(12) United States Patent  
Audebert et al.

(10) Patent No.: US 8,892,891 B1  
(45) Date of Patent: *Nov. 18, 2014

(54) METHOD AND SYSTEM FOR ESTABLISHING A COMMUNICATIONS PIPE BETWEEN A PERSONAL SECURITY DEVICE AND A REMOTE COMPUTER SYSTEM

(71) Applicant: Assa Abloy AB, Stockholm, CA (US)

(72) Inventors: Yves Louis Gabriel Audebert, Los Gatos, CA (US); Olivier Clemot, Rueil-Malmaison (FR)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,179

(22) Filed: Feb. 13, 2013

Related U.S. Application Data

(63) Continuation of application No. 12/925,664, filed on Oct. 27, 2010, now Pat. No. 8,402,275, which is a continuation of application No. 10/476,416, filed as application No. PCT/EP02/03928 on Apr. 9, 2002, now Pat. No. 7,853,789, which is a continuation of application No. 09/844,246, filed on Apr. 30, 2001, now abandoned.

(51) Int. Cl.  
*H04L 29/06* (2006.01)  
*G06F 21/62* (2013.01)  
*H04L 9/32* (2006.01)  
*G06F 7/04* (2006.01)  
*G06F 15/16* (2006.01)  
*G06F 17/30* (2006.01)

(52) U.S. Cl.  
CPC .................................. *G06F 21/6218* (2013.01)  
USPC ................................... 713/172; 726/9; 705/66

(58) Field of Classification Search  
None  
See application file for complete search history.

(56) References Cited

U.S. PATENT DOCUMENTS

| 6,385,729 | B1 * | 5/2002 | DiGiorgio et al. ................ 726/9 |
| 2001/0025882 | A1 * | 10/2001 | Coulier ......................... 235/380 |
| 2002/0016855 | A1 * | 2/2002 | Garrett et al. ................ 709/238 |
| 2004/0024901 | A1 * | 2/2004 | Agrawal et al. .............. 709/238 |

* cited by examiner

*Primary Examiner* — Shin-Hon Chen  
(74) *Attorney, Agent, or Firm* — Muirhead and Saturnelli, LLC

(57) ABSTRACT

A method and a system is provided for establishing a communications path over a communications network between a personal security device (PSD) and a remote computer system without requiring the converting of high-level messages such as API-level messages to PSD-formatted messages such as APDU-formatted messages (and inversely) to be installed on a local client device in which the PSD is connected.

9 Claims, 7 Drawing Sheets

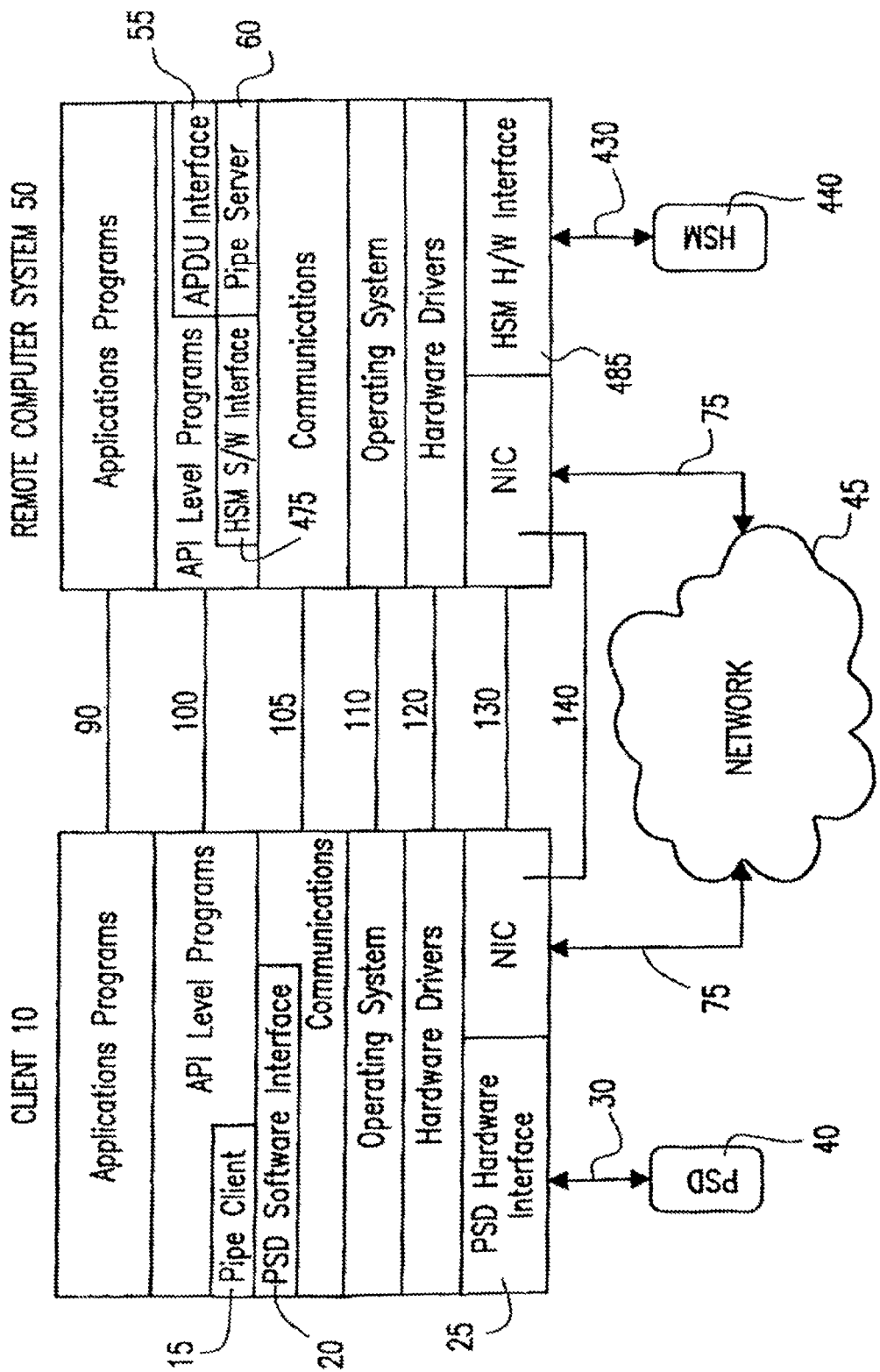

Figure 1:
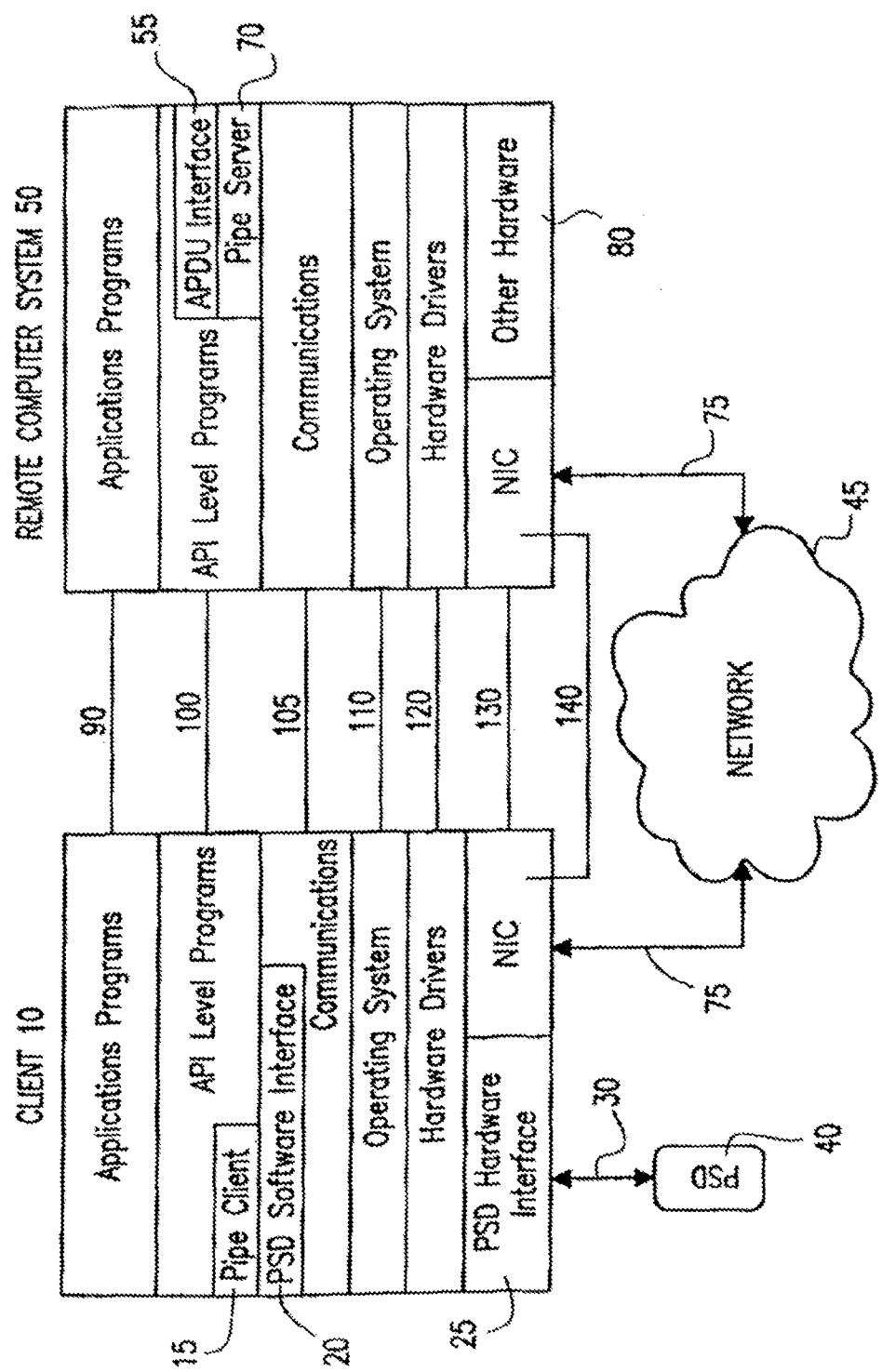

METHOD AND SYSTEM FOR ESTABLISHING A COMMUNICATIONS PIPE BETWEEN A PERSONAL SECURITY DEVICE AND A REMOTE COMPUTER SYSTEM

RELATED APPLICATIONS

This application is a continuation of U.S. application Ser. No. 12/925,664, filed Oct. 27, 2010 (pending), which is a continuation of U.S. application Ser. No. 10/476,416, filed Oct. 30, 2003 (issued, U.S. Pat. No. 7,853,789), which is a 371 application of PCT application number PCT/EP2002/03928, filed Apr. 9, 2002 (completed), which is a continuation of U.S. application Ser. No. 09/844,246, filed Apr. 30, 2001 (abandoned), the entire contents of which are incorporated by reference herein.

1. FIELD OF INVENTION

The present invention relates to a method and system for establishing a communications path (the "pipe") over a communications network between a Personal Security Device (PSD) and a Remote Computer System.

2. BACKGROUND OF INVENTION

The current art involving the use of Personal Security Devices (PSO), for example, smart cards, subscriber identity module (SIM) cards, biometric devices, or combinations thereof, requires specialized messaging software or firmware to be installed on a local Client in which the PSD is connected. These specialized routines are used to translate messages from high-level messaging formats into low-level messaging formats (i.e. into PSD-formatted messages). An example of such routines is what is generally known in the art as an Application Protocol Data Unit (APDU) interface. Installing and maintaining APDU interfaces for a large number of local Clients can be a substantial and costly challenge in a multi-user organization. In addition, Client resources such as disk space; memory and computing resources are unnecessarily tied up by the software, which could be better utilized for other purposes.

Another significant limitation of the current art is that security mechanisms are implemented on a local Client to gain access to secure functions contained within a connected PSD. In a typical secure transaction with a PSD, a request is generated in the local Client by way of high-level software such as API-level software, which is subsequently encrypted in the Client and translated into APDU messaging format using an APDU interface, and sent to the PSD to access the intended secure function.

The potential exposure of secure information weakens the basic functionality of current PSDs, which is to protect private keys and other proprietary information from being unnecessarily disclosed. The limitations of the current art are such that localized key generating mechanisms, APDU interface software and transactions involving this software are potentially vulnerable to compromise by unauthorized programs running on the local Client or by other illicit means intending to monitor the key generation process and thus gaining access to security codes, algorithms and other sensitive data contained within the PSD or elsewhere. These limitations are magnified in a multi-user environment where the ability to control unauthorized access to local Clients and vulnerable software contained therein is increased.

3. SUMMARY OF INVENTION

It is an object of the present invention to provide a method for establishing a communications path (the "pipe") over a communications network between a Personal Security Device (PSD) and a Remote Computer System without requiring means for converting high-level messages such as API-level messages to PSD-formatted messages such as APDU-formatted messages (and inversely) to be installed on a local Client in which a PSD is connected.

This object is achieved with a method for establishing a communications pipe between at least one PSD and at least one Remote Computer System over a network using at least one Client as a host to said at least one PSD, said at least one Client and said at least one Remote Computer System being in functional communications using a packet-based communications protocol over said network, said method comprising the steps of:

a) generating or retrieving, in said at least one Remote Computer System, a request to access said at least one PSD, said request being in a high-level messaging format, b) converting, in said at least one Remote Computer System, said request from said high-level messaging format to a PSD-formatted request message, c) encapsulating, in said at least one Remote Computer System, said PSD-formatted request message with said packet-based communications protocol, thus producing an encapsulated PSD-formatted request message, d) transmitting said encapsulated PSD-formatted request message, using said packet-based communications protocol, from said at least one Remote Computer System to said at least one Client via said network, e) extracting, in said at least one Client, said PSD-formatted request message from said encapsulated PSD-formatted request message, f) transmitting said PSD-formatted request message from said at least one Client to said at least one PSD, g) processing, in said at least one PSD, said PSD-formatted request message, thus producing an PSD-formatted response message, h) transmitting said PSD-formatted response message from said at least one PSD to said at least one Client, i) encapsulating, in said at least one Client, said PSD-formatted response message with said packet-based communications protocol, thus producing an encapsulated PSD-formatted response message, j) transmitting said encapsulated ADPU-formatted response message, using said packet-based communications protocol, from said at least one Client to said at least one Remote Computer System via said network, k) extracting, in said at least one Remote Computer System, said PSD-formatted response message from said encapsulated PSD-formatted response message, and l) converting, in said at least one Remote Computer System, said PSD-formatted response message into a high-level response message, and m) processing said high-level response message in said at least one Remote Computer System.

With this method, conversion of high-level messages such as API-level messages to PSD-formatted messages such as APDU-formatted messages, and inversely, is made in the Remote Computer System. The local Client acts as a transparent host which allows a connected PSD to communicate with one or more Remote Computer Systems over a network.

By moving means for converting high-level messages such as API-level messages to PSD-formatted messages such as APDU-formatted messages (and inversely) from numerous local Clients to one or a few secure Remote Computer Systems, the overall data processing system is much easier to maintain and significantly less susceptible to unauthorized access or compromise.

The communications pipe generation may be initiated automatically upon connection of a PSD to a local Client, by a Client side request for access to information contained on another networked Client or Remote Computer System, or by a Remote Computer System requesting access to a PSD.

In this invention, PSD-formatted messages are preferentially encapsulated into a common communications protocols, such as TCP/IP, WAP, etc. which are used to communicate between one or more Clients with one or more Remote Computer Systems. A program installed on each local Client and each Remote Computer System separates the incoming low-level PSD-formatted messages from the incoming message packets and routes the PSD-formatted messages to a connected PSD via its hardware device interface. In a multitasking operating environment, the Client is free to perform other data processing functions while transactions between a PSD and a Remote Computer System using the pipe are executed in the background. In situations where a firewall may mask individual Client network addresses, remote computer based pipe software should be installed on the proxy server. Other solutions common to virtual private networking may also be employed.

For purposes of this invention a Client may be any intelligent device such as a personal computer, laptop, cellular telephone, Personal Data Assistant (PDA), etc. which provides the network communications interface between a PSD and a Remote Computer System. A Remote Computer System includes any intelligent device which provides the necessary communications interface between networked devices and a PSD.

In a first embodiment of the invention, a communications pipe is formed when a Remote Computer System generates the proper PSD-formatted messages which are encapsulated into an agreed upon communications protocol, transmitted (broadcast for general polling or specific IP address of Client) over a network, invoking a reply by one or more PSDs which is (are) subsequently received by the requesting Remote Computer System. The latter described pipe formation process is equivalent to a handshake between a PSD and a Remote Computer System.

This first embodiment of the invention is useful in determining the status, identification and other derived information related to responding PSDs. For example, an APDU formatted polling command may be transmitted from the Remote Computer System over a network to all PSDs capable of receiving the command requesting each PSD to return its unique identification number or some other non-proprietary information. Based on the replies received, it is possible to determine which PSDs are active, their relative location, length of time each PSD has been active, network traffic information, etc. This first embodiment of the method of the invention does not require the use of secure communications protocols.

In a second embodiment of the invention, referred to as secure pipe generation, security mechanisms are employed to protect against unauthorized disclosure of proprietary information. The secure pipe generation process is equivalent to the pipe generating process described above but includes the added steps of generating cryptographically secured PSD-formatted messages, which are then encapsulated into a secure communications protocol, examples of which include TCP/IP with secure socket layer (SSL) encryption, IPSEC, etc. to generate a secure pipe between a Remote Computer System and a PSD.

In this second embodiment of the invention, PSD-formatted messages are encrypted using the proper keys to unlock secure applications and data contained within the secure domain of a PSD. Response PSD-formatted messages containing sensitive or proprietary information are likewise encrypted by the PSD and decrypted by the Remote Computer System.

The cryptographically secured PSD-formatted messages are encapsulated into outgoing message packets using the agreed communications secure protocol, sent over a network and routed through the PSD hardware interface by the Client and into the PSD as before. This second embodiment of the invention is useful in initializing a PSD, personalizing a PSD, accessing secure information contained within a PSD, changing, upgrading or deleting proprietary algorithms or data contained in a PSD, authenticating an end user, etc.

It is another object of the invention to provide a system for implementing the above-mentioned method.

4. BRIEF DESCRIPTION OF THE DRAWINGS

Figure 2:
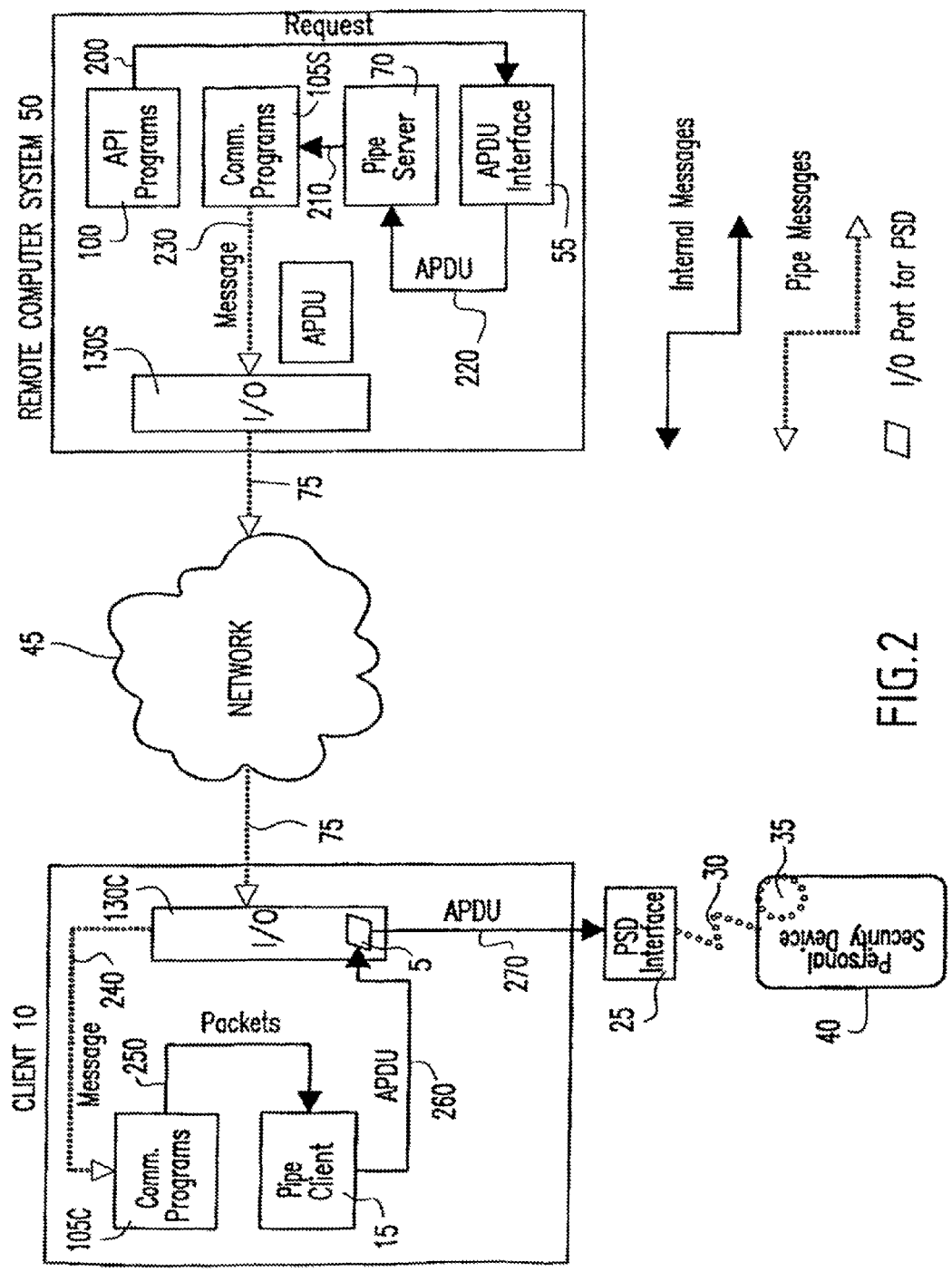
Figure 3:
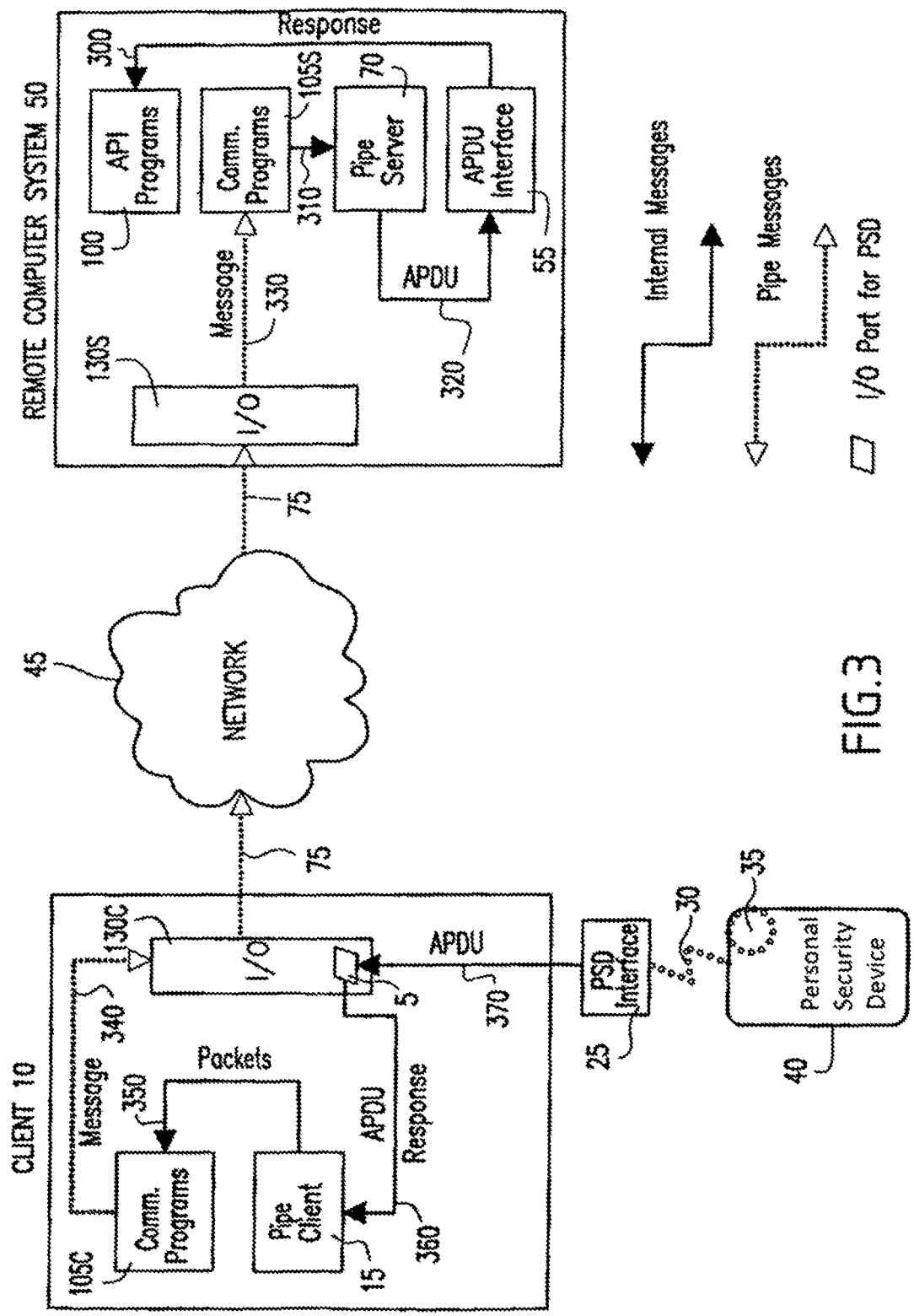
Figure 4A:
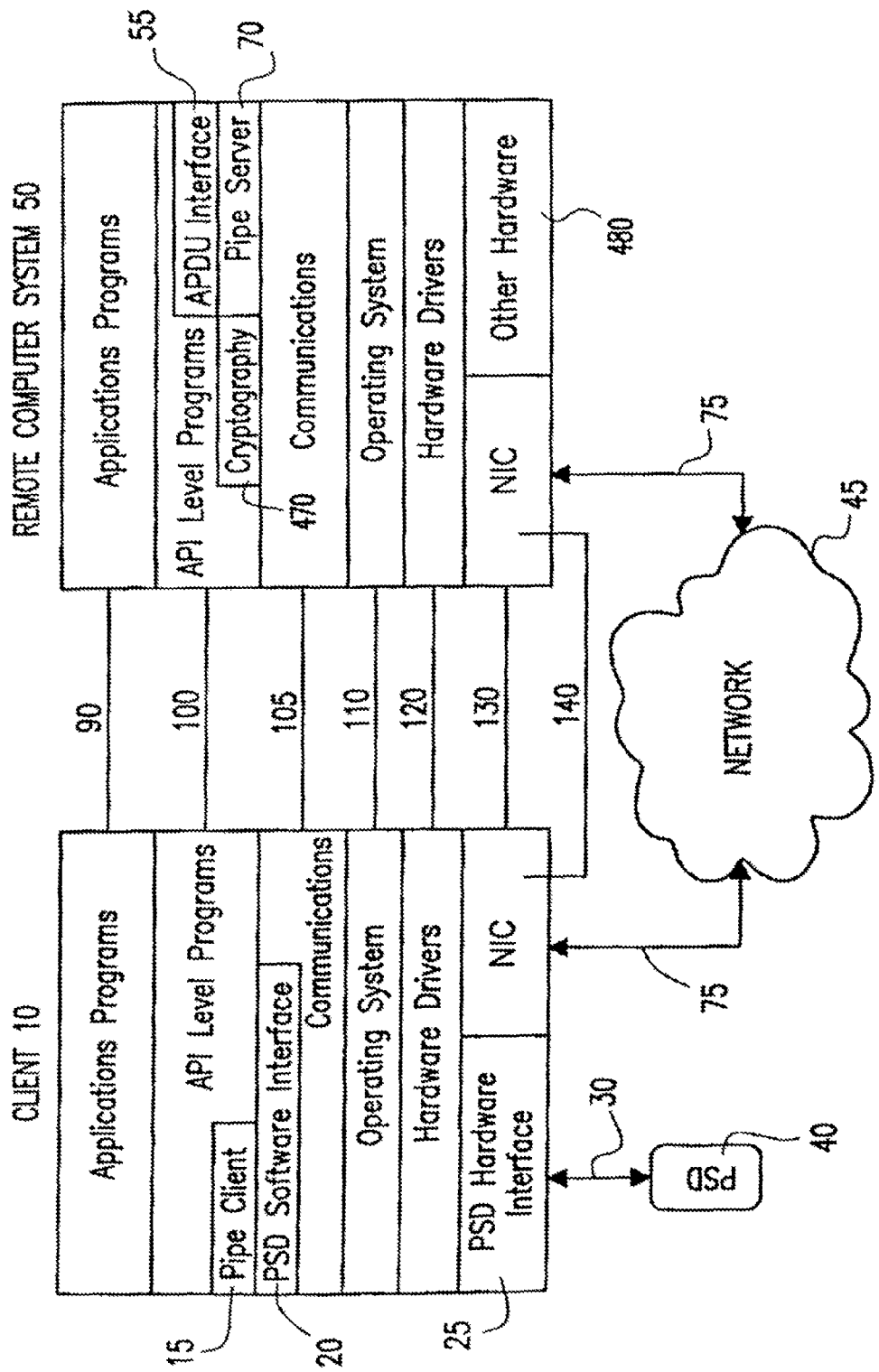
Figure 5:
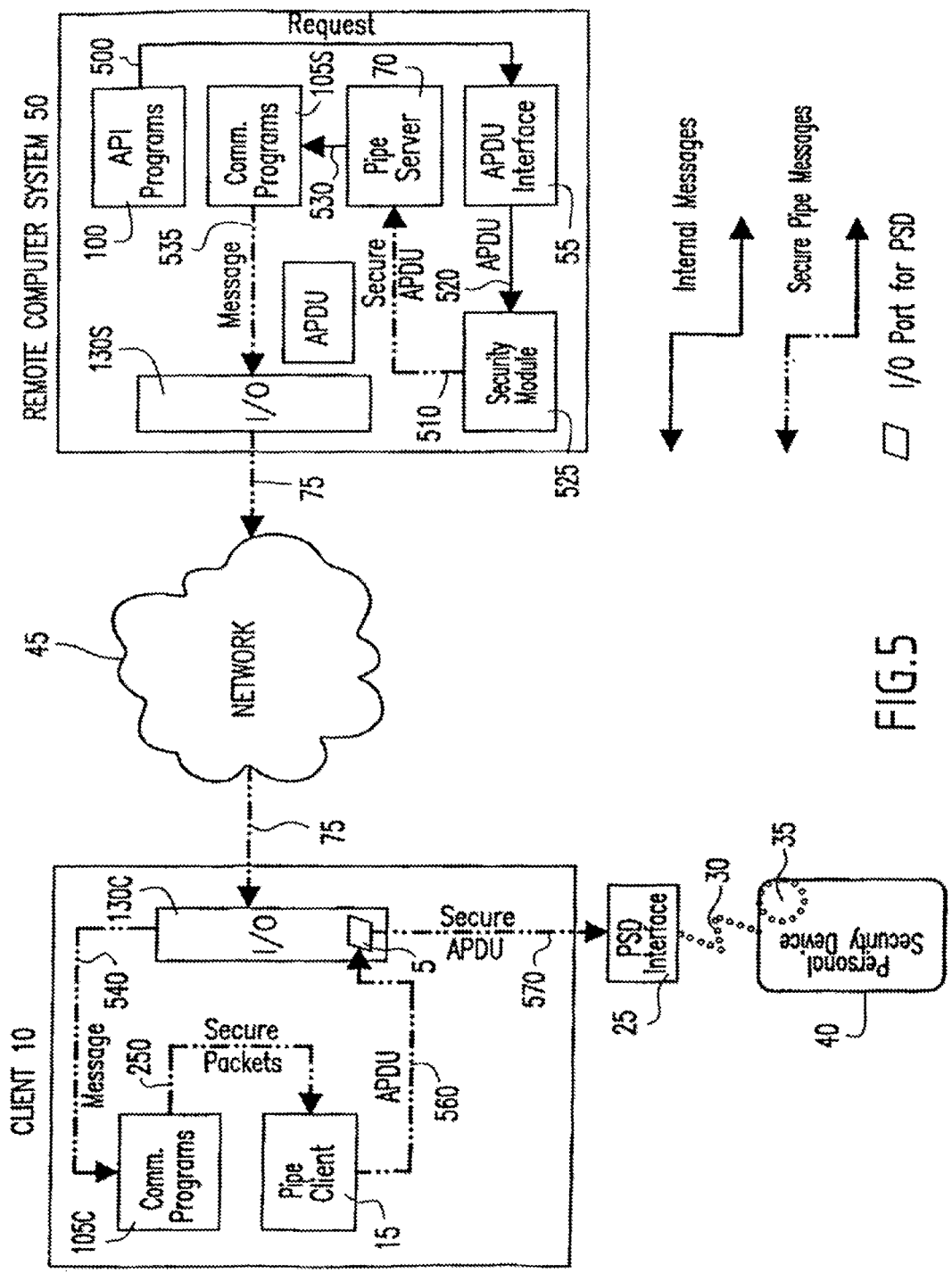
Figure 6:
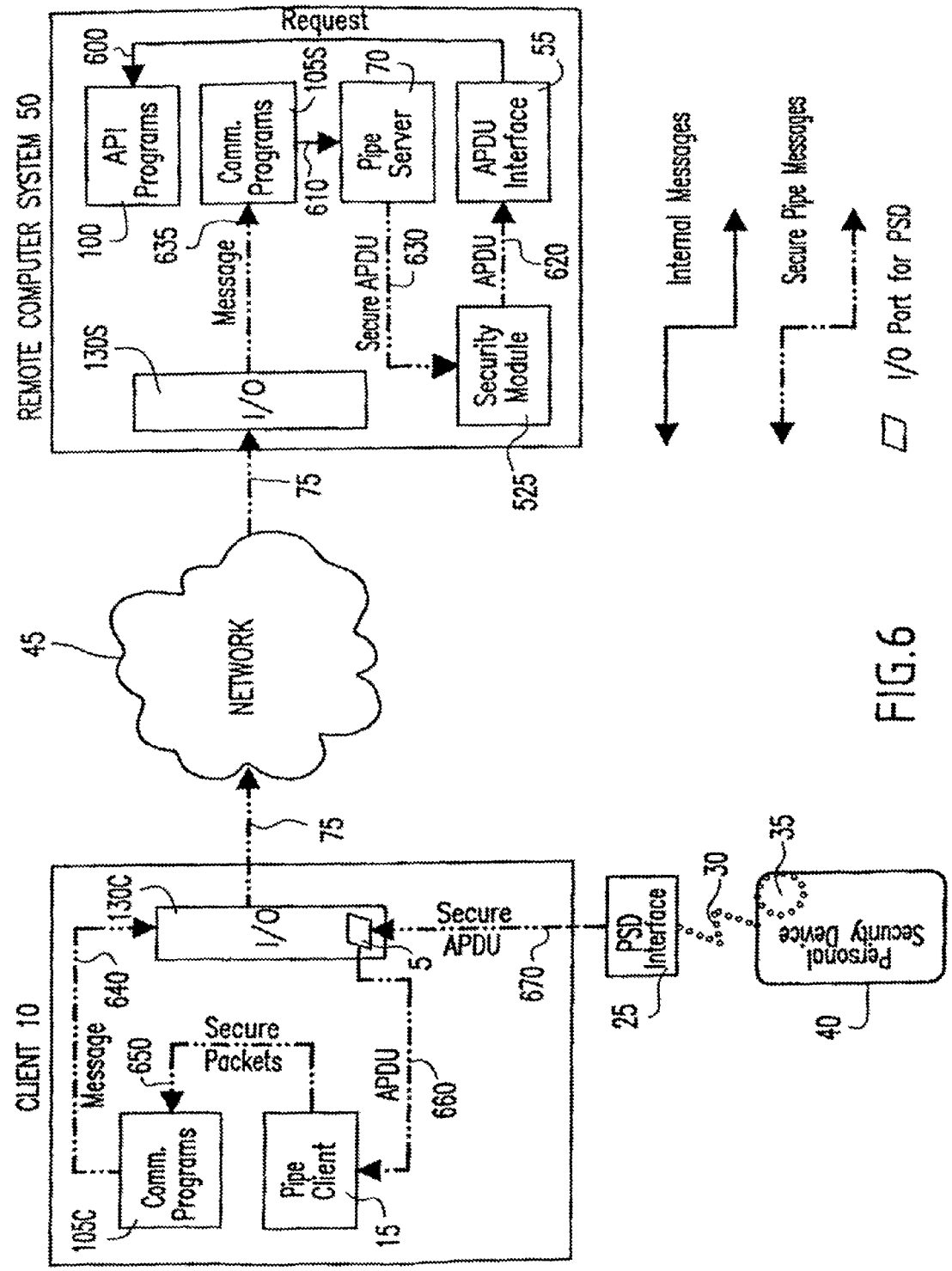

A more complete understanding of the present invention may be accomplished by referring to the following Detailed Description and Claims, when viewed in conjunction with the following drawings:

FIG. 1—is a generalized system block diagram for implementing present invention (first embodiment), FIG. 2—is a detailed block diagram depicting initiating a communications pipe where non-proprietary information is being requested (first embodiment), FIG. 3—is a detailed block diagram depicting establishing a communications pipe where non-proprietary information is being requested (first embodiment), FIG. 4A—is a generalized system block diagram for implementing present invention which includes software-based security mechanisms (second embodiment), FIG. 4B—is a generalized system block diagram for implementing present invention which includes HSM based security mechanisms (second embodiment), FIG. 5—is a detailed block diagram depicting initiating a secure communications pipe (second embodiment), and FIG. 6—is a detailed block diagram depicting establishing a secure communications pipe (second embodiment).

5. DETAILED DESCRIPTION OF THE INVENTION

This invention provides a method and system to establish a remote communications pipe over a network between a Remote Computer System and a Personal Security Device connected to a host local Client. In this invention, Personal Security Devices (PSD) are intelligent devices such as smart cards, biometric devices, Subscriber Identification Module (SIM) cards, or combinations thereof having a microprocessor, runtime operating environment, an input/output communication port, memory storage including nonvolatile memory and random access memory and embedded software applications.

Two embodiments of the invention are described; a first embodiment (FIGS. 1 to 3) in which security mechanisms are not employed and a second embodiment (FIGS. 4A to 6) where security mechanisms are employed.

Note also that the following description of the invention will be based on a PSD which receives and sends APDU- (Application Protocol Data Unit)-formatted messages.

APDU messaging format, which is per se known in the art, is a lower-level messaging format which allows a PSD to communicate with higher-level applications located in devices to which the PSD is to be connected.

It must be clear that the present invention is not limited to the use of an APDU messaging format, and that any other low-level messaging format that can be processed by the PSD enters within the scope of the present invention.

In the appended claims, a message having such a format will be designated by the generic expression "PSD-formatted message".

5.1. Detailed Description of a First Embodiment of the Invention

Referring now to FIG. 1, a generalized system block diagram of a first embodiment of the invention depicted. The various layers shown are based on the Open System Interconnection model (OSI). For simplicity, certain layers common to both the Client and Remote Computer System are not shown and should be assumed to be present and incorporated into adjacent layers. The layers common to both a Client and Remote Computer System include:
- an Applications Layer 90 which generally contains higher level software applications (e.g. word processor) and a user interface and such as a Graphical User Interface (GUI),
- an Applications Programming Interface (API) Layer 100 for processing and manipulating data for use by either higher or lower level applications,
- a Communications Layer 105 which contains communications programs including secure communications capabilities, which enable a Client to communicate with a Remote Computer System to exchange information in an agreed upon protocol and visa versa,
- an Operating System Layer 110 or equivalent runtime environment, which controls the allocation and usage of hardware resources such as memory, Central Processing Unit (CPU) time, disk space, hardware I/O port assignments, peripheral device management,
- a Hardware Drivers Layer 120 which permits the operating system to communicate and control physical devices connected to the Client's or Remote Computer System's hardware I/O bus,
- and a Physical Device Layer 130 where Network Interface Cards (NIC) 140 provide the physical connections to a telecommunications network 45. Other Hardware Devices 80 may also be connected at this Layer.

5.1.1. Client Specific Features

A specialized program contained within the API Layer 100 of the Client and referred to as a Pipe Client 15, interacts with Communications Programs contained within the Communications Layer 105. The Pipe Client 15 functions to separate encapsulated. APDU requests from incoming messaging packets received from a network 45 for processing by a locally connected PSD 40. Alternately, outbound APDU responses generated by a locally connected PSD 40, are processed by the Pipe Client for encapsulation into an agreed upon communications protocol by Communications Programs contained within the Communications Layer 105.

A software driver contained within the Communications Layer 105 of the Client and referred to as a PSD Software Interface 20 directs incoming APDUs communicated by the Pipe Client 15 into the I/O device port connecting the PSD Hardware Device Interface 25 to the locally connected PSD 40. Outgoing APDUs generated by the PSD are communicated through the PSD Hardware Device Interface 25 through the I/O device port to the PSD Software Interface 20 and subsequently communicated to the Pipe Client 15.

5.1.2. Remote Computer System Specific Features

A first specialized program contained within the API Layer 100 of the Remote Computer System 50 and referred to as an APDU Interface 55, translates higher level messaging formats into low-level APDU messaging format required to communicate with a PSD 40. Alternately, the APDU Interface 55 translates incoming APDU responses received from a PSD 40 into higher level messaging formats used by programs in the API Layer 100 and Applications Layer 90 of the Remote Computer System.

A second specialized program contained within the API Layer 100 of the Remote Computer System 50 and referred to as a Pipe Server 70 interacts with Communications Programs contained within the Communications Layer 105. The Pipe Server 70 functions to separate encapsulated APDU requests from incoming messaging packets received from a network 45 for processing by the APDU Interface 55. Alternately, outbound APDU requests translated by the APDU Interface 55 are processed by the Pipe Server for encapsulation into an agreed upon communications protocol by Communications Programs contained within the Communications Layer 105.

5.1.3. Other Inventive Features

The connection 30 between the PSD 40 and PSD Hardware Interface 25 includes but is not limited to traditional electrical or optical fiber connections or wireless means including optical, radio, acoustical, magnetic, or electromechanical. Likewise the connection 75 between the Client 10 and the network 45, and the connection 75 between the Remote Computer System 50 and the network 45 may be accomplished analogously.

The network, shown generally at 45, includes both public and private telecommunications networks connected by traditional electrical, optical, electro-acoustical (DTMF) or by other wireless means. Any mutually agreed upon communications protocol capable of encapsulating APDU commands may be employed to establish a communications pipe including open or secure communications protocols.

Referring now to FIG. 2, depicts initiating a communications pipe between the Remote Computer System 50 and the PSD 40 connected to a Client 10. In this depiction, the Remote Computer System 50 is sending a request to PSD 40 for non-proprietary embedded information 35, for example an identification number. PSD 40 is connected 30 to the local Client 10 using PSD Interface 25. PSD Interface 25 communicates with the Client 10 via hardware device port 5.

To initiate a communications pipe between Remote Computer System 50 and PSD 40, the Remote Computer System 50 generates a request 200 by way of API programs 100 which is translated into APDU format 220 by the APDU Interface 55 and sent to the Pipe Server 70 for message encapsulation. The encapsulated APDUs are then sent 210 to the Communications Programs 105S for incorporation into outgoing message packets 230.

The message packets 230 containing the encapsulated APDUs are transmitted 75 over the network 45 via a Network Interface Card (I/O) 130S. The Client 10 receives the message packets 240 containing the encapsulated APDUs which are received from the network 45 via a Network Interface Card (I/O) 130C installed on the local Client. The incoming messages are processed by Client-side Communications Programs 105C and routed 250 into the Pipe Client 15 for APDU extraction. The extracted APDUs are sent 260 through hardware device port 5, routed 270 into the PSD Interface 25 and sent to PSD 40 via connection 30 for processing within PSD domain 35.

Alternative requests to form a communications pipe 75 between a Remote Computer System 50 and a PSD 40 may be initiated by Client 10 requesting access to information contained on one or more networked local Clients, by connecting a PSD 40 to PSD Interface 25 which initiates a request to form a communications pipe 75, or by another Remote Computer System requesting access to PSD 40.

Referring now to FIG. 3, depicts a PSD response which establishes the communications pipe between PSD 40 and Remote Computer System 50. In this depiction, the request previously received is processed within the PSD domain 35, which generates a response message. The PSD response is sent in APDU format from PSD 40 through connection 30 and into PSD interface 25. The PSD response is then routed 370 through hardware device port 5 and sent 360 to the Pipe Client 15 for processing and encapsulation. The resulting message packets are then sent 350 to the Client-side Communications Programs 105C for incorporation into outgoing message packets 340. The message packets 340 containing the encapsulated APDUs are transmitted 75 over the network 45 via the Network Interface Card (I/O) 130C.

The Remote Computer System 50 receives the message packets 330 containing the encapsulated APDUs, which are received from the network 45 via the Network Interface Card (I/O) 130S installed on the Remote Computer System. The incoming messages are processed by server-side Communications Programs 105S and routed 310 into the Pipe Server 70 for APDU extraction. The extracted APDUs are sent 320 to the APDU Interface 55 for processing and translation into a higher-level format and sent 300 to API Level programs 100 for processing and further transactions with the PSD 40 if desired.

5.2. Detailed Description of a Second Embodiment of the Invention

Referring now to FIG. 4A, a generalized system, block diagram of one implementation of a secure communications pipe is shown. The general system block diagram includes an additional software-based Cryptography Module 470 installed on the Remote Computer System, which is not shown in FIG. 1.

FIG. 4B depicts an alternative to using software-based security mechanisms. In this alternative embodiment of the invention, a Hardware Security Module (HSM) 440 is employed to perform cryptographic functions. To access the HSM, a software driver referred to as an HSM S/W Interface 475, is included in the API Layer 100. The HSM software driver communicates with a physical device interface included in the Physical Device Layer 130. The physical device interface is installed on the I/O bus of the Remote Computer System, and is referred to as an HSM H/W Interface 485. The HSM module 440 is connected 430 to the HSM H/W Interface a manner analogous to the PSD connection to the PSD Interface previously described. The use of HSM technologies provides end-to-end security, which further reduces the possibility of unauthorized disclosure of cryptographic or sensitive information.

Both APDU messaging security mechanisms shown in FIGS. 4A & 4B are used to generate cryptographic keys necessary to unlock secure functions and data contained within the secure domain of a PSD, encrypt outgoing APDUs and decrypt incoming encrypted APDUs. The security mechanisms employed in generating a secure pipe may include synchronous, asynchronous or any combination of cryptography methods.

Secure communications protocols used to communicate over a network are accomplished by the Communications Programs contained within the Communications Layers 105. Cryptography used in generating secure communications may employ the security mechanisms described for APDU messaging, employ separate, mechanisms or employ any combination thereof.

Referring now to FIG. 5, depicts the initiating of a secure pipe between the Remote Computer System and the PSD 40 connected to Client 10. In this depiction, Remote Computer System 50 is sending a secure request to PSD 40 for proprietary embedded information 35, for example an authentication password. PSD 40 is connected 30 to the local Client 10 using PSD Interface 25. PSD Interface 25 communicates with the Client 10 via hardware device port 5.

To initiate a secure communications pipe between Remote Computer System 50 and PSD 40, a request 500 is generated on Remote Computer System 50 to access PSD 40 by way of API programs 100 which are translated into APDU format by the APDU Interface 55. The APDUs are then sent 520 to a Security Module 525 for encryption using a pre-established cryptography method. The proper cryptographic parameters may be determined by using a look-up table or database, which cross-references the PSD's unique internal identification information with one or more codes necessary to implement the appointed cryptography method.

The encrypted APDUs are then routed 510 to the Pipe Server 70 for message encapsulation. The encapsulated APDUs are then sent 530 to the Communications Programs 105 for processing, encryption using a pre-established secure communications protocol and incorporation into outgoing message packets 535. The secure message packets 535 containing the encrypted and encapsulated APDUs are transmitted 75 over the network 45 via a Network Interface Card (I/O) 130S.

The Client 10 receives the message packets 540 containing the encrypted and encapsulated APDUs which are received from the network 45 via a Network Interface Card (I/O) 130C installed on the local Client 10.

The incoming encrypted message packets are decrypted and processed using the pre-established cryptography employed in the secure communications protocol by Client-side Communications Programs 105C. The unencrypted message packets still containing the encrypted APDUs are routed 550 into the Pipe Client 15 for APDU extraction. The extracted APDUs are sent 560 through hardware device port 5, routed 570 into the PSD Interface 25 and sent to PSD 40 via connection 30 for decryption and processing within the secure domain 35 of the PSD 40. Using a pre-established cryptography method, incoming secure APDUs are decrypted and requests processed.

Referring now to FIG. 6, depicts a PSD secure response, which establishes the secure communications pipe between PSD 40 and Remote Computer System 50. In this depiction, the secure request previously received is processed within the secure domain 35 of the PSD 40, which causes the PSD to generate a secure response message using a pre-established cryptography method.

The PSD secure response is sent in APDU format from PSD 40 through connection 30 and into PSD interface 25. The PSD secure response is then routed 670 through hardware device port 5 and sent 660 to the Pipe Client 15 for processing and encapsulation. The resulting message packets are then sent 650 to the Client-side Communications Programs 105 for processing, encryption using a pre-established secure communications protocol and incorporation into outgoing message packets 640. The message packets 640 containing the encapsulated APDUs are transmitted 75 over the network 45 via the Network Interface Card (I/O) 130C.

The Remote Computer System 50 receives the message packets 635 containing the encapsulated APDUs from the network 45 via the Network Interface Card (I/O) 130S installed on the Remote Computer System 50. The incoming messages are processed and decrypted using the pre-established cryptography method employed in the secure communications protocol by the server-side Communications Programs 105 and routed 610 into the Pipe Server 70 for secure APDU extraction. The extracted secure APDUs are sent 630 to the Security Module 525 for decryption of the secure APDUs using the pre-established cryptography method. The decrypted APDUs are then routed 620 to the APDU Interface 55 for processing and translation into a higher-level format and sent 600 to API programs 100 for processing and further transactions with the PSD 40 if desired. This step establishes the secure "pipe" to communicate with the PSD. The secure pipe is maintained until the Remote Computer System signals the Client to close the hardware interface port 5.

No limitation is intended in the number of PSDs and Clients forming secure pipes 75 with one or more Remote Computer System(s) 50, nor should any limitation on the number of Remote Computer Systems 50 available for generating secure pipes 75 be construed from the drawings. Lastly, no limitation is intended concerning the initiating event to establish a communications pipe.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that the scope of the invention be limited by this Detailed Description, but rather by the Claims following herein.

The invention claimed is:

1. A non-transitory computer-readable medium, that contains software that establishes a communications pipe between at least one personal security device (PSD) and at least one remote computer system over a network using at least one client device, the software comprising:

executable code that converts a request to access the at least one PSD from said high-level messaging format to a PSD-formatted request message;

executable code that encapsulates the PSD-formatted request message with a packet-based communications protocol, thus producing an encapsulated PSD-formatted request message;

executable code that transmits via the network the encapsulated PSD-formatted request message, using the packet-based communications protocol, from the at least one remote computer system to the at least one client device;

executable code that extracts the PSD-formatted request message from the encapsulated PSD-formatted request message;

executable code that transmits the PSD-formatted request message from the at least one client device to the at least one PSD;

executable code that processes the PSD-formatted request message, thus producing a PSD-formatted response message;

executable code that transmits the PSD-formatted response message from the at least one PSD to the at least one client device;

executable code that encapsulates the PSD-formatted response message with the packet-based communications protocol, thus producing an encapsulated PSD-formatted response message;

executable code that transmits the encapsulated PSD-formatted response message, using the packet-based communications protocol, from the at least one client device to the at least one remote computer system via the network;

executable code that extracts the PSD-formatted response message from the encapsulated PSD-formatted response message;

executable code that converts the PSD-formatted response message into a high-level response message; and executable code that processes the high-level response message in the at least one remote computer system.

2. A non-transitory computer-readable medium according to claim 1, further comprising:

executable code that encrypts the PSD-formatted request message in the at least one remote computer system;

executable code that decrypts the PSD-formatted request message in the at least one PSD;

executable code that encrypts the PSD-formatted response message in the at least one PSD; and executable code that decrypts the PSD-formatted response message in the at least one remote computer system.

3. A non-transitory computer-readable medium according to claim 2, wherein the at least one PSD includes unique identification information.

4. A non-transitory computer-readable medium according to claim 3, further comprising:

executable code that cross-references the unique identification information with a look-up table in order to select at least one cryptographic device for encrypting and decrypting the PSD-formatted request message and encrypting and decrypting the PSD-formatted response message.

5. A non-transitory computer-readable medium according to claim 1, further comprising:

executable code that initiates the communications pipe automatically upon connection of the at least one PSD to said at least one client device.

6. A non-transitory computer-readable medium according to claim 1, further comprising:

executable code that initiates the communications pipe upon an initial request generated by the at least one client device.

7. A non-transitory computer-readable medium according to claim 1, further comprising:

executable code that initiates the communications pipe upon an initial request generated by at least one remote computer system.

8. A non-transitory computer-readable medium according to claim 1, further comprising:

executable code that establishes the communications pipe in the background.

9. A non-transitory computer-readable medium according to claim 1, wherein the high-level messaging format is an API-level format, and wherein the PSD-formatted messages are APDU-formatted messages.

* * * * *